United States Patent [19]

Iwata

[11] Patent Number: 5,629,883

[45] Date of Patent: May 13, 1997

[54] CORRELATION DETECTOR

[75] Inventor: Toshio Iwata, Sagamihara, Japan

[73] Assignee: Kabushiki Kaisha Kenwood, Tokyo, Japan

[21] Appl. No.: 306,945

[22] Filed: Sep. 16, 1994

[30] Foreign Application Priority Data

Sep. 29, 1993 [JP] Japan .................... 5-265700

[51] Int. Cl.⁶ .................................................. G06F 17/15
[52] U.S. Cl. ...................... 364/728.07; 364/728.03
[58] Field of Search ................ 364/728.07, 728.03, 364/607, 604

[56] References Cited

U.S. PATENT DOCUMENTS

| | | | |
|---|---|---|---|
| 4,404,645 | 9/1983 | Elings et al. | 364/728.07 |
| 4,486,900 | 12/1984 | Cox et al. | 364/728.07 |
| 4,791,599 | 12/1988 | Hethuin et al. | 364/728.07 |
| 5,305,243 | 4/1994 | Ayraud et al. | 364/604 |
| 5,404,320 | 4/1995 | Butler | 364/604 |

FOREIGN PATENT DOCUMENTS 2196158   4/1988   United Kingdom.

OTHER PUBLICATIONS

Journal of Physics E. Scientific Instruments, vol. 16, No. 9, Sep. 1983, Dorking GB, pp. 836–839, G. Comoretto "A microprocessor–controlled multichannel counter for a digital autocorrelator".

*Primary Examiner*—Tan V. Mai
*Attorney, Agent, or Firm*—Sixbey Friedman Leedom & Ferguson; Gerald J. Ferguson, Jr.; Evan R. Smith

[57] ABSTRACT

A correlation detector capable of obtaining a more correct and natural correlation value. The correlation detector outputs a correlation value representative of autocorrelation in accordance with a sum (r+ra) of the number r of consecutive autocorrelated data items before one timing and the number ra of consecutive autocorrelated data items after the one timing.

3 Claims, 6 Drawing Sheets

FIG. 2A CK 
FIG. 2B AC 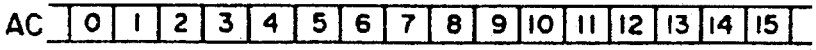
FIG. 2C IN 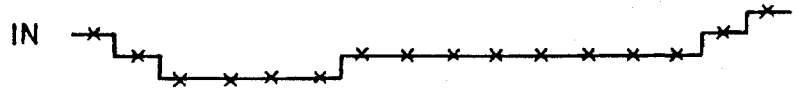
FIG. 2D f 
FIG. 2E CK 
FIG. 2F r 
FIG. 2G e1 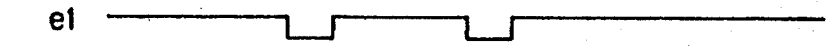
FIG. 2H CK 
FIG. 2I TIME COUNTER 4A 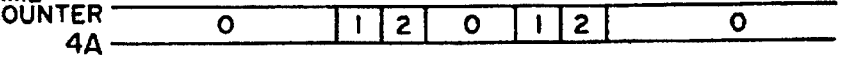
FIG. 2J C1 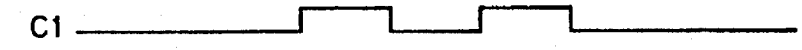
FIG. 2K e2 
FIG. 2L CK 
FIG. 2M TIME COUNTER 4B 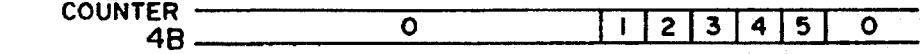
FIG. 2N C2 
FIG. 2O NW 
FIG. 2P r 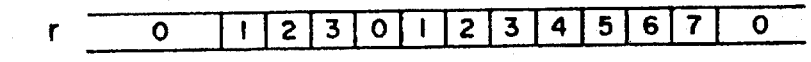
FIG. 2Q DO 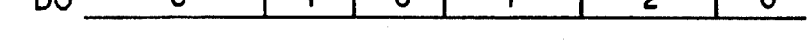
FIG. 2R D 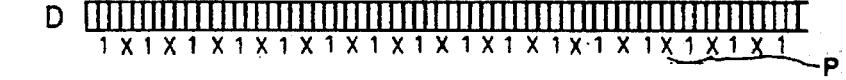
FIG. 2S AC 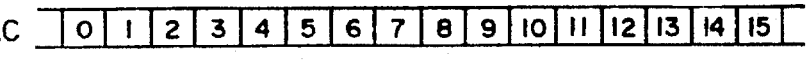
FIG. 2T A 

FIG.6A
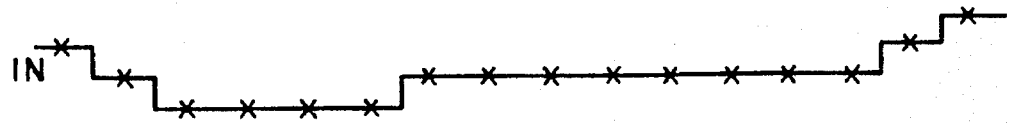
FIG.6B
FIG.6C
FIG.6D
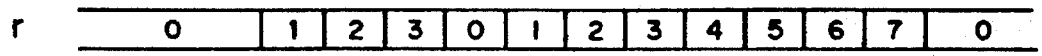
FIG.6E
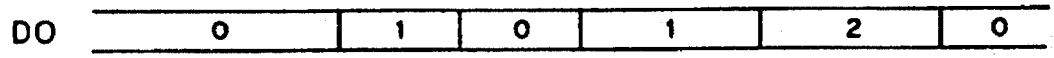
FIG.6F
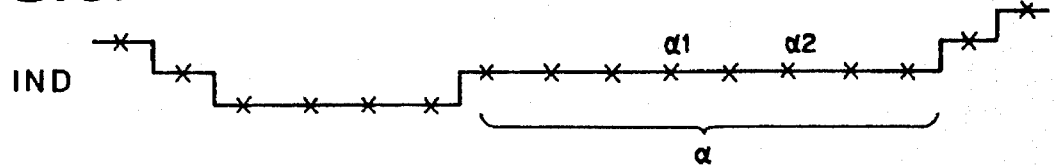
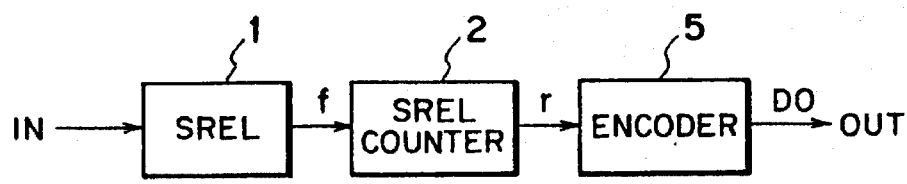
FIG.7
PRIOR ART ized level.

CORRELATION DETECTOR

BACKGROUND OF THE INVENTION

1. Field of the Invention

The present invention relates to a correlation detector for outputting a degree of autocorrelation of a digital signal obtained by sampling and quantizing an analog signal, where a degree of autocorrelation corresponds to the number of consecutive samples which have a substantially identical quantized level.

2. Related Background Art

A correlation detector for detecting a degree of correlation of an input signal has generally a circuit structure such as shown in FIG. 7. An input signal is sampled by a sampling pulse having a frequency F, and a presence/absence of autocorrelation between data of the input signal at one timing and at a timing immediately before the one timing is detected by an autocorrelation detector circuit 1. A presence of "autocorrelation" between two data samples means that two data samples have a substantially identical quantized level. An absence of autocorrelation between them means that they have different quantized levels. In accordance with the detection results, an autocorrelation counter 2 counts the number r of consecutive autocorrelated data items (i.e. the number r of consecutive samples having a substantially identical quantized level) before one timing of the input signal. A value D0 corresponding to the output r of the autocorrelation counter 2 is outputted as a correlation value.

The operation of the conventional correlation detector shown in FIG. 7 will be described. The autocorrelation detector circuit (SREL) 1 is supplied with an input signal IN sampled at a clock ck such as shown in FIG. 6A. A presence/absence of autocorrelation between data of the input signal at one timing and at a timing immediately before the one timing is detected, and the detection result is outputted as a correlation presence/absence signal f (FIG. 6B) which is inputted to the autocorrelation counter 2. The length of the H level of the signal f is outputted as the count signal r (FIG. 6D) from the autocorrelation counter 2 which is inputted to an encoder 5. The encoder 5 outputs D0=0 for $0 \leq r \leq 1$, D0=1 for $2 \leq r \leq 4$, and D0=2 for $5 \leq r$ (see FIG. 6E).

A clock signal CK is shown in FIG. 6C. There is a one clock delay when D0 is outputted. Therefore, the input signal IN is delayed by one clock to obtain a delayed input signal IND (FIG. 6F) which is compared with the signal D0. At a timing $\alpha 1$ of the signal IND, three consecutive autocorrelated data items are present before the timing $\alpha 1$, and so r=3 at $\alpha 1$. Five consecutive autocorrelated data items are present before a timing $\alpha 2$, and so r=5 at $\alpha 2$. The signal r is inputted to the encoder 5 which outputs a value corresponding to the value r. In this case, D0=1 at $\alpha 1$, and D0=2 at $\alpha 2$.

An output D0 of the conventional correlation detector is a value corresponding to the value r which is the number of consecutive autocorrelated data items before one timing of the input signal, and is not the number of consecutive autocorrelated data items after one timing of the input signal. Therefore, a correlation value obtained by the conventional correlation detector is not natural from the viewpoint of senses.

SUMMARY OF THE INVENTION

It is an object of the present invention to provide a correlation detector capable of obtaining a more correct and natural correlation value.

According to one aspect of the present invention solving the above problem, there is provided a correlation detector for outputting a correlation detector outputs a correlation value representative of autocorrelation in accordance with a sum (r+ra) of the number r of consecutive autocorrelated data items before one timing and the number ra of consecutive autocorrelated data items after the one timing.

According to another aspect of the present invention, there is provided a correlation detector including:

an autocorrelation detector circuit for receiving an input signal sampled by a sampling pulse having a frequency F and outputting a signal representative of a presence/absence of autocorrelation between data of the input signal at one timing and data at a timing immediately before the one timing;

an autocorrelation counter receiving an output of the autocorrelation detector circuit and counting and outputting the number r of consecutive autocorrelated data items before the one timing;

an encoder for receiving an output of the autocorrelation counter and outputting a value D0 determined in correspondence with the number r;

n comparators for receiving an output of the autocorrelation counter, comparing the number r with predetermined values r1, r2, ..., rn, and outputting signals e1, e2, ..., en indicating timings when the number r becomes equal to the values r1, r2, ..., rn;

n time counters for receiving the outputs of the n comparators and outputting signals c1, c2, ..., cn representative of the count period starting in response to the signals e1, e2, ..., en and terminating after predetermined periods of T1, T2, ..., Tn;

a memory read/write controller for receiving the outputs of the n time counters and outputting a write gate signal NW causing a period t0 to be always a write period, causing periods t1, t2, ..., tn to be a write period only when the signals e1, e2, ... en are generated, and causing a period t(n+1) to be always a read period, the periods t0, t1, t2, .., tn, t(n+1) being obtained by dividing a 1/F period into (n+2) periods or more;

a memory data controller for receiving an output of the encoder, outputting the value during the period t0, and outputting predetermined values D1, D2, ..., Dn during the periods t1, t2, ..., tn;

an address counter for counting a clock having the frequency F and outputting a count Ac;

a memory address controller for receiving an output of the address counter and outputting values Ac+A0, Ac A1, Ac+A2, ..., Ac+An, and Ac+A(n+1) obtained by adding the count Ac to predetermined values A0, A1, A2, ..., An, and A(n+1);

a memory whose read/write is controlled by the outputs of the memory read/write controller, the memory data controller, and the memory address controller; and a sampler for sampling and outputting an output of the memory during the memory read period.

The correlation detector of this invention outputs a correlation value representative of autocorrelation in accordance with a sum (r+ra) of the number r of consecutive autocorrelated data items before one timing and the number ra of consecutive autocorrelated data items after the one timing.

For example, referring to FIG. 6F, eight consecutive autocorrelated data items are present during the period $\alpha$, and the periods $\alpha 1$ and $\alpha 2$ belong to the same group. According to the present invention, a degree of autocorrelation is more natural from the viewpoint of senses if it is determined basing upon the number f of consecutive autocorrelated data items before one timing, than if it is determined basing upon the number r=ra of consecutive autocorrelated data items before and after the one timing.

BRIEF DESCRIPTION OF THE DRAWINGS

FIGS. 2A through 2T show waveforms making up a timing chart explaining the operation of the correlation detector shown in FIG. 1.

FIGS. 6A through 6F show waveforms making up a timing chart explaining the operation of a conventional correlation detector.

FIG. 7 is a block diagram showing the structure of a conventional correlation for detecting a degree of correlation of an input signal.

DETAILED DESCRIPTION OF THE PREFERRED EMBODIMENTS

An embodiment of the present invention will be described with reference to the accompanying drawings.

Figure 1:
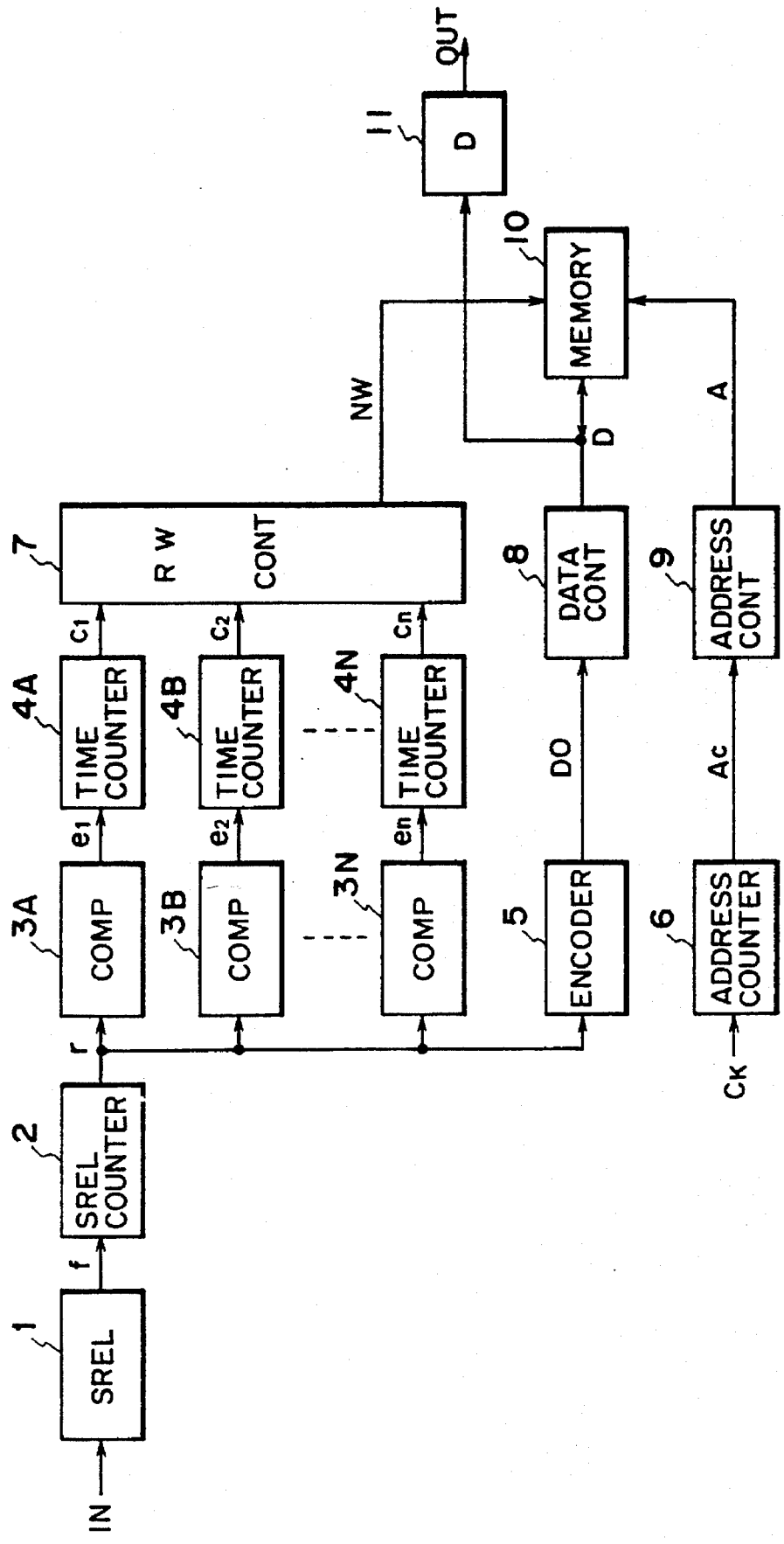
FIG. 1 is a block diagram showing the structure of a correlation detector according to an embodiment of the present invention.

FIG. 1 is a block diagram showing the structure of a correlation detector according to an embodiment of the present invention.

The operation of the correlation detector shown in FIG. 1 will be described with reference to the timing charts shown in FIGS. 2A–2T and 3A–3O. In the following description, it is assumed N=2.

An address counter 6 is supplied with a clock ck having a frequency F, and outputs a count Ac. An autocorrelation detector circuit 1 is supplied with an input signal IN sampled at a clock ck such as shown in FIG. 6C, and outputs a signal f representative of a presence/absence of autocorrelation between data of the input signal at one timing and at a timing immediately before the one timing. This signal f is inputted to an autocorrelation counter 2 which counts the H level length of the signal f and outputs a count r.

The count r of the autocorrelation counter 2 is supplied to a comparator (COMP) 3A which outputs an L level signal e1 only when the count r is r=r1 (=2). The signal e1 is inputted to a time counter 4A which outputs an H level signal c1 only during a T1 (=2/F) period starting from the rising edge of the signal e1. The signal r is also supplied to a comparator 3B which outputs an L level signal e2 only when the count r is r=r2 (=5). The signal e2 is inputted to a time counter 4B which outputs an H level signal c2 only during a T2 (=5/F) period starting from the rising edge of the signal e2.

The output signals c1 and c2 of the time counters 4A and 4B are inputted to a memory read/write control circuit 7. While the signal c1 takes the H level, the period t1 during a 1/F period takes the L level, and while the signal c2 takes the H level, the period t2 during the 1/F period takes the L level. The period t0 during the 1/F period always takes the L level irrespective of the level of the signals c1 and c2. As a result, a signal NW is outputted from the memory read/write circuit 7. A portion p of the signal NW is shown enlarged in FIG. 3A. As indicated at NWL in FIG. 3, the periods t0 and t2 take the L level.

The output r of the autocorrelation counter 2 is also supplied to an encoder 5 which outputs a signal D0=0 for $0 \leq r \leq 1$, D0=1 for $2 \leq r \leq 4$, and D0=2 for $5 \leq r$. The signal D0 is supplied to a memory data controller 8 which outputs one of "0, 1, 2" (D0) during the period t0 in the 1/F period, outputs always "1" (D1) during the period t1 in the 1/F period irrespective of the value of D0, and outputs always "2" (D2) during the period t2 in the 1/F period irrespective of the value of D0. As a result, an output D of the memory data controller 8 becomes as shown in FIG. 2R. The portion p of the signal D is shown enlarged in FIG. 3B at DL. It can be seen from FIG. 3B that "2" (D0) is outputted during the period t0, "1" (D1) is outputted during the period t1, and "2" (D2) is outputted during the period t2.

Figure 3A:
FIG. 3A through 3O show waveforms making up a timing chart explaining the operation of the correlation detector shown in FIG. 1.
Figure 3B:
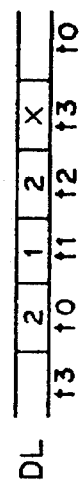
Figure 3C:
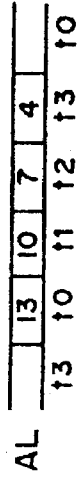

An output Ac of the address counter 6 is supplied to a memory address controller 9 which outputs a signal A="Ac−1" (Ac+A0) during the t0 period in the 1/F period, A="Ac−4" (Ac+A1) during the t1 period in the 1/F period, A="Ac−7" (Ac+A2) during the t2 period in the 1/F period, and A="Ac−10" (Ac+A3) during the t3 period in the 1/F period. The portion p of the signal A is shown in FIG. 3C at AL. Since Ac=14, "13" (Ac+A0) is outputted during the period t0, "10" (Ac+A1) is outputted during the period t1, "7" (Ac+A2) is outputted during the period t2, and "4" (Ac+A3) is outputted during the period t3.

The outputs of the memory read/write controller 7, memory data controller 8, and memory address controller are supplied to a memory 10 to control the memory read/write.

An output of the correlation detector can be obtained by sampling an output of the memory 10 during the memory read period t3.

If there are r consecutive autocorrelated data items before one timing of an input signal and ra consecutive autocorrelated data items after the timing, the correlation detector performs the above-described operation and outputs a value of r+ra. The reason why the correlation detector outputs this value will be given below.

Figure 3D:
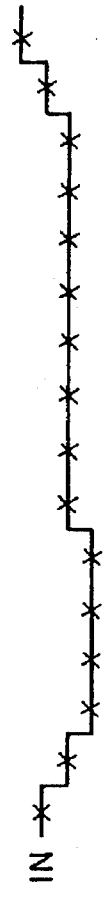
Figure 3E:
Figure 3F:

The correspondence between the output Ac of the address counter and the input signal IN is assumed to be that shown in FIGS. 3D and 3E. Assuming that the memory address is Am=Ac, the correspondence between the memory address Am and the memory data Dm becomes as shown in FIGS. 3F and 3G.

FIG. 3I also shows the correspondence between the memory address Am and memory data Dm' when the output D0 of the encoder 5 is written in the memory during the period t0 in the 1/F period. This correspondence is similar to a conventional correlation detector.

Figure 3G:
Figure 3H:
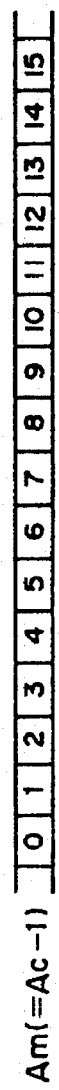

As understood from a comparison between the memory data Dm and memory data Dm' shown in FIGS. 3G and 3I, the memory data is necessarily Dm="1" at the memory addresses Am="2" and "3". Similarly, the memory data is necessarily Dm="2" at the memory addresses Am="6", "7", "8", "9", and "10".

In order to compensate for such discrepancy, according to the present invention, data in the memory is rewritten by using the periods t1 and t2 in the 1/F period.

During the periods at Ac=6 and 7, in response to the output c1 of the time counter 4A, memory data Dm="1" is written in the memory at the memory addresses Am="2" and "3" during the period t1 in the 1/F period. During the periods at Ac=10 and 11, Dm="1" is written in the memory at the memory addresses "6" and "7".

Similarly, during the periods at Ac="13", "14", "15", "16", and "17", in response to the output c2 of the time counter 4B, Dm="2" is written in the memory at the memory addresses Am="6", "7", "8", "9", and "10" during the period t2 in the 1/F period.

In reading the memory data Dm, the memory address Am is moved back more than a maximum value (in this case, "7" addresses) of moving back the memory address Am for the data rewrite. In this embodiment, the memory address Am is moved back by "10" addresses for reading the memory data Dm. Memory data at an address moved back to "10" addresses is not rewritten again. Therefore, the correspondence between Am and Dm becomes as shown in FIG. 3, and a value corresponding to an expected correlation value can be read.

As described above, the output r of the autocorrelation counter is compared with the predetermined values r1 (=2) and r2 (=5) by the two comparators which output signals e1 and e2 indicating timings when the output r becomes equal to the values r1 and r2. The output signals e1 and e2 of the two comparators are supplied to the two time counters which output signals c1 and c2 representative of the count period starting in response to the signals e1 and e2 and terminating after the predetermined periods of T1 (=2/F) and T2 (=5/F). The memory addresses are moved back by preset addresses A1 (–4) and A2 (–7) during the periods indicated by the signal c1 and c2, preset data D1 (=1) is written in the memory for the signal c1, and preset data D2 (=2) is written in the memory for the signal c2. In this manner, a correlation value corresponding to a value of r+ra can be obtained if there are r consecutive autocorrelated data items before one timing of an input signal and ra consecutive autocorrelated data items after the timing.

Figure 4:
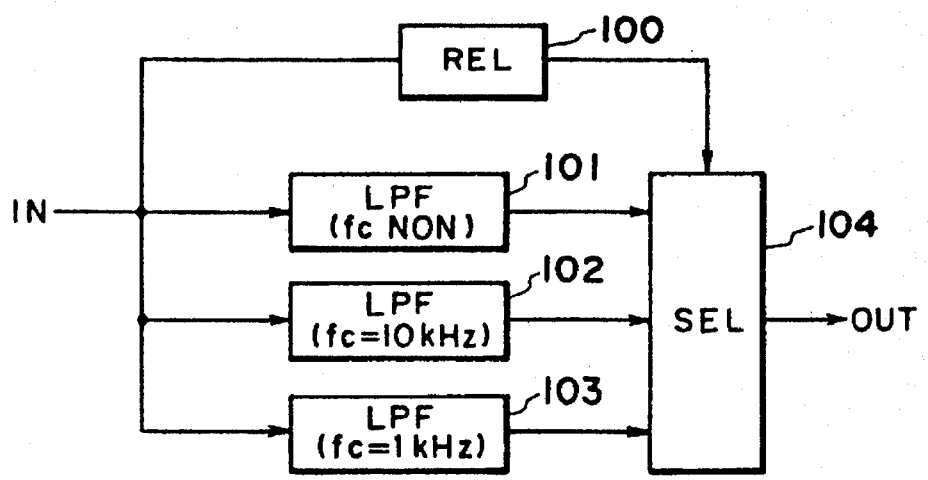
FIG. 4 is a block diagram showing the structure of a modification of a correlation detector according to the invention.
Figure 5A:
FIGS. 5A through 5G show waveforms making up a timing chart explaining the operation of the correlation detector shown in FIG. 4.
Figure 5B:
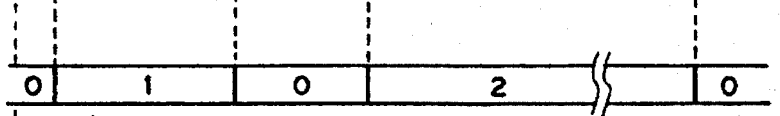
Figure 5C:
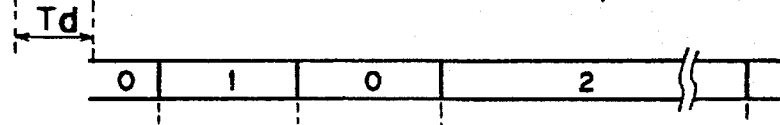
Figure 5D:
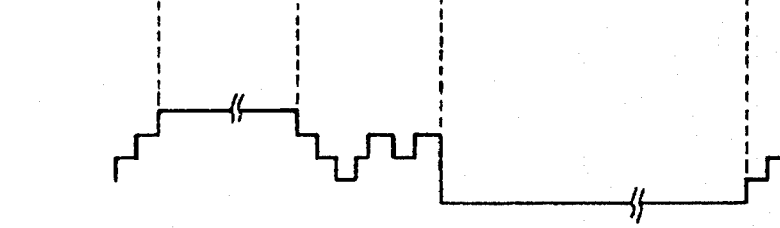
Figure 5E:
Figure 5F:
Figure 5G:
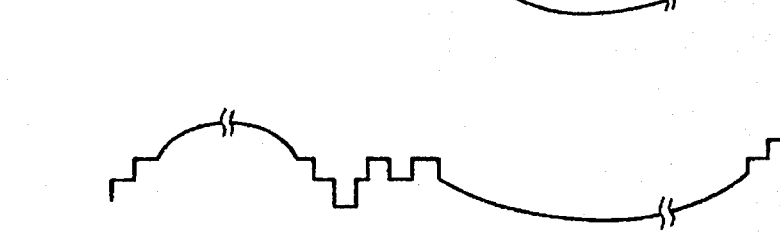

FIG. 4 is a block diagram showing the structure of a modification of a correlation detector according to the invention.

This modification is a quantization error eliminator which is constituted by a correlation detector (REL) 100 having the structure shown in FIG. 1, low-pass filters (LPF) 101 to 103, and a selector (SEL) 104.

The operation of the quantization error eliminator will be described with reference to the timing chart of FIG. 5.

An input signal A is supplied to the correlation detector 100 which outputs a correlation value as a signal B. This signal B is delayed by a predetermined time Td for compensating for the delay time Td of the filter, and outputted as a signal C. The input signal A is also supplied to the three low-pass filters 101 to 103 and filtered. The low-pass filter 101 is a through-filter having no cut-off frequency, the low-pass filter 102 has a cut-off frequency of 10 kHz, and the low-pass filter 103 has a cut-off frequency of 1 kHz.

The outputs D, E, and F of the low-pass filters 101 to 103 are supplied to the selector 104 and selectively outputted therefrom in response to the output signal C of the correlation detector 100. As indicated at G in FIG. 5, the output signal of the selector 100 shows that it has been subjected to filtering to the extent corresponding to the length of a flat portion. Specifically, since it is considered that the longer the flat portion, the greater the quantization distortion, a through-output of the filter 101 is selected if the correlation value is "0", an output of the filter 102 is selected if the correlation value is "1", and an output of the filter 103 is selected if the correlation value is "2".

As described above, in the correlation detector of the invention, the output r of the autocorrelation counter is compared with predetermined values r1, r2, . . . , rn by n comparators which output signals e1, e2, . . . , en indicating timings when the output r becomes equal to the values r1, r2, . . . , rn. The output signals e1, e2, . . . , en of the n comparators are supplied to n time counters which output signals c1, c2, . . . , cn representative of the count period starting in response to said signals e1, e2, . . . , en and terminating after predetermined periods of T1, T2, . . . , Tn. The memory addresses are moved back by preset addresses A1, A2, . . . , An during the periods indicated by the signal c1, c2, . . . , cn, preset data D1, D2, . . . , Dn are written in the memory for the signals c1, c2, . . . , cu. In this manner, a correlation value corresponding to a value of r+ra can be obtained if there are r consecutive autocorrelated data items before one timing of an input signal and ra consecutive autocorrelated data items after the timing.

As described above, the correlation detector of this invention can obtain a more natural and precise correlation value.

What is claimed is:

1. An apparatus for processing a digital signal obtained by sampling and quantizing an analog signal, said apparatus comprising:

a comparator for comparing a quantized level at one sample point with a quantized level at a sample point immediately before said one sample point, a counter means for counting the number of consecutive samples having a substantially identical quantized level before one sample point, an encoder means for outputting a predetermined code corresponding to a count value outputted from said counter means, a write means for writing into a memory said predetermined code outputted from said encoder, a modification means responsive to the count value from said counter means for modifying a plurality of previously written codes, and a read means for reading out the written codes from said memory after completion of the code modification, whereby the code corresponding to a sum (r+ra) of the number r of consecutive samples having a substantially identical quantized level before one sample point and the number ra of consecutive samples having said substantially identical quantized level after said one sample point is outputted.

2. An apparatus for processing a digital signal obtained by sampling and quantizing an analog signal, said apparatus comprising:

a detector circuit for receiving an input sampled by a sampling pulse having a frequency F and outputting a signal representative of whether a quantized level of sample at one timing point substantially equals a quantized level of sample at a timing immediately before said one timing;

a counter receiving an output of said detector circuit and counting and outputting the number r of consecutive samples having a substantially identical quantized level before said one timing;

an encoder for receiving an output of said counter and outputting a value DO determined in correspondence with said number r;

n comparators for receiving an output of said counter, comparing said number r with predetermined values r1, r2 . . . , rn, and outputting signals e1, e2, . . . , en indicating timings when said number r becomes equal to said values r1, r2, ..., rn;

n time counters for receiving the outputs of said n comparators and outputting signals c1, c2, ..., cn representative of the count period starting in response to said e1, e2, ..., en and terminating after predetermined period of T1, T2, ..., Tn;

a memory read/write controller for receiving the outputs of said n time counters and outputting a write gate signal NW causing a period t0 to be always a write period, causing periods t1, t2, ..., tn to be a write period only when said signals e1, e2, ..., en are generated, and causing a period t(n+1) to be always a read period, said periods t0, t1, t2, ..., tn, t(n+1) being obtained by dividing a 1/F period into (n+2) periods or more;

a memory data controller for receiving an output of said encoder, outputting said value D0 during said period t0, and outputting predetermined values D1, D2, ..., Dn during said periods t1, t2, ..., tn;

an address counter for counting a clock having said frequency F and outputting a count Ac;

a memory address controller for receiving an output of said address counter and outputting during said periods t1, t2, ..., tn the values Ac+A0, Ac+A1, Ac+A2, ..., Ac+An, and Ac+A (n+1) obtained by adding said count Ac to predetermined values A0, A1, A2, ..., An, and A (N+1);

a memory whose read/write is controlled by the outputs of said memory read/write controller, said memory data controller, and said memory address controller; and a sampler for sampling and outputting an output of said memory during said memory read period.

3. An apparatus for processing a digital signal obtained by sampling and quantizing an analog signal, said apparatus comprising:

a counter means for counting the number of consecutive samples having a substantially identical quantized level in said digital signal, a plurality of digital low pass filters each for attenuating a high frequency component in said digital signal, said digital low pass filters having different cut-off frequencies respectively and being operative only during a time section where consecutive samples having a substantially identical quantized level are generated, and a selector means responsive to the output of said counter means for selecting a desired one of the outputs of said digital low pass filters such a manner that the larger the count value outputted from said counter means, the lower the cut-off frequency of the selected digital low pass filter.

* * * * *